US006950791B1

(12) United States Patent
Bray et al.

(10) Patent No.: US 6,950,791 B1
(45) Date of Patent: Sep. 27, 2005

(54) METHOD FOR DESCRIBING OBJECTS IN A VIRTUAL SPACE

(75) Inventors: Tim W. Bray, Vancouver (CA); David G. Ashworth, North Vancouver (CA)

(73) Assignee: Antartica Systems, Inc., Vancouver (CA)

( * ) Notice: Subject to any disclaimer, the term of this patent is extended or adjusted under 35 U.S.C. 154(b) by 876 days.

(21) Appl. No.: 09/712,544

(22) Filed: Nov. 14, 2000

Related U.S. Application Data

(60) Provisional application No. 60/232,284, filed on Sep. 13, 2000, and provisional application No. 60/232,213, filed on Sep. 13, 2000.

(51) Int. Cl.$^7$ .............................................. G06F 9/45
(52) U.S. Cl. ............................ 703/22; 345/420; 463/32
(58) Field of Search ........................... 703/22; 345/420, 345/850, 717; 463/32; 700/118

(56) References Cited

U.S. PATENT DOCUMENTS

| | | | |
|---|---|---|---|
| 5,555,354 A | | 9/1996 | Strasnick et al. |
| 5,808,613 A | | 9/1998 | Marrin et al. |
| 5,889,951 A | | 3/1999 | Lombardi |
| 5,923,330 A | | 7/1999 | Tarlton et al. |
| 5,935,210 A | | 8/1999 | Stark |
| 5,987,469 A | | 11/1999 | Lewis et al. |
| 6,035,330 A | | 3/2000 | Astiz et al. |
| 6,055,563 A | * | 4/2000 | Endo et al. ................. 709/203 |
| 6,070,176 A | | 5/2000 | Downs et al. |
| 6,081,273 A | * | 6/2000 | Weng et al. ................ 345/420 |
| 6,532,021 B1 | * | 3/2003 | Tognazzini et al. ......... 345/629 |
| 6,624,826 B1 | * | 9/2003 | Balabanovic ............... 345/727 |
| 6,629,097 B1 | * | 9/2003 | Keith ............................ 707/5 |
| 6,692,357 B2 | * | 2/2004 | Koizumi et al. ............. 463/32 |

OTHER PUBLICATIONS

Michael J. Martinez, "Web Goes Graphic", ABCNEWS.com [online], (Mar. 13, 1999), [retrieved on Jul. 25, 2002]. Retrieved from the Internet: < URL: http://abcnews.go.com/sections/tech/DailyNews/interface990313.html>.

Matthew Mirapaul, "3–D Space as New Frontier", *The New York Times on the Web*, [online], (Oct. 5, 2000), [retrieved on Jul. 25, 2002]. Retrieved from the Internet: < URL: http://www.nytimes.com/2000/10/05/technology/05SPAC.html>.

* cited by examiner

*Primary Examiner*—Albert W. Paladini
(74) *Attorney, Agent, or Firm*—Oppenheimer Wolff & Donnelly LLP

(57) ABSTRACT

A method for describing objects in a virtual space. In one embodiment, each object is a URL, which has been assigned to a system of hierarchical categories. The objects have been mapped to a map region, each object having been given a location within the map region. Each category within the map region is defined as a polygon area covering all of the category's objects as well as all of the category's subcategories. A client computer can request a portion of the map to be visualized. A host computer receives the request and retrieves the appropriate objects and categories from a database. The host computer forms the response to the request using a protocol which describes facts, location, and metadata about the objects and categories. The encoded response is delivered to the client. The client decodes the response and renders the objects and categories for the user. Different types of clients can concurrently request object descriptions from the server.

9 Claims, 14 Drawing Sheets

Map Server Overview

Figure 6B - Three Dimensional Visualization
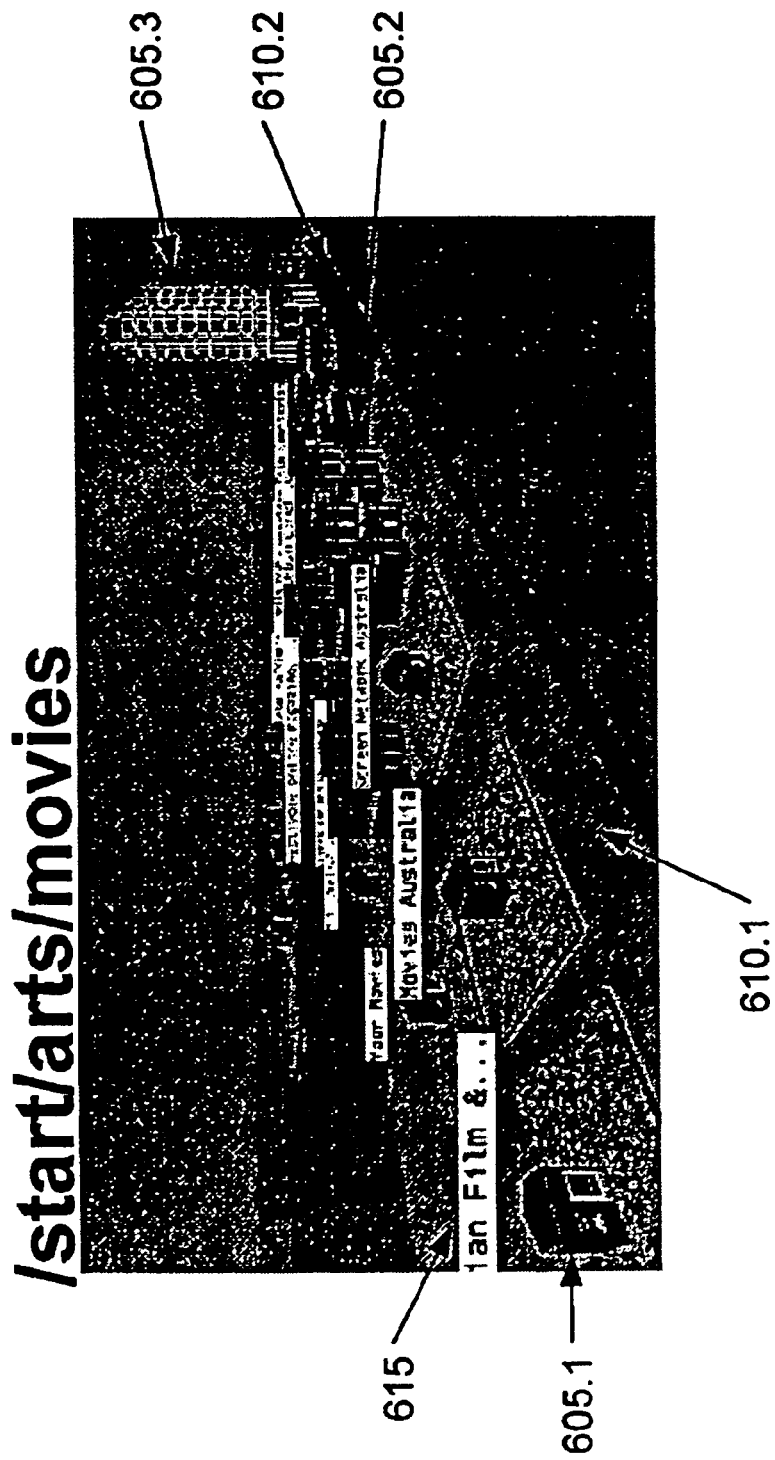

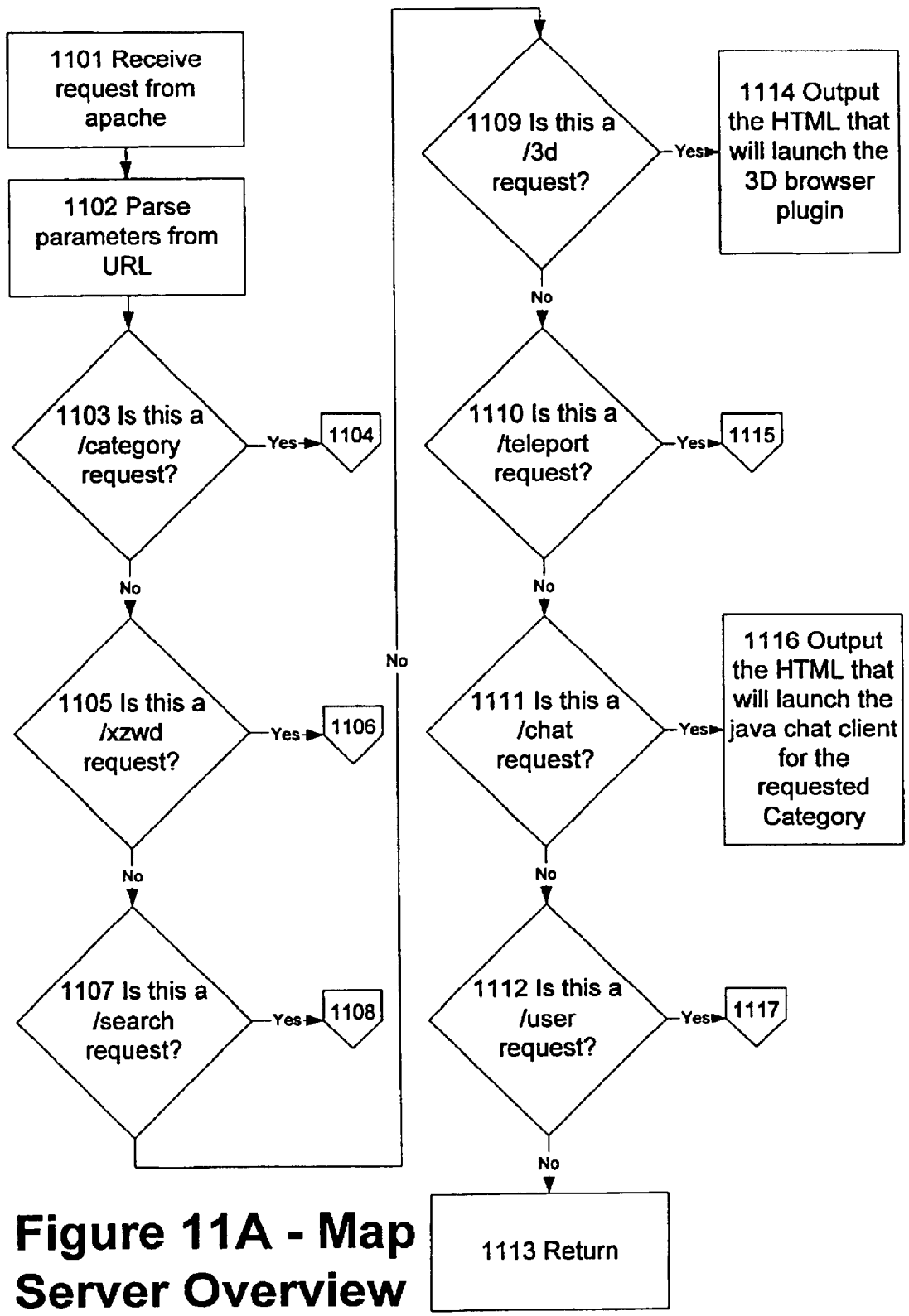
Figure 11A - Map Server Overview

FIGURE 11B - /category Handler
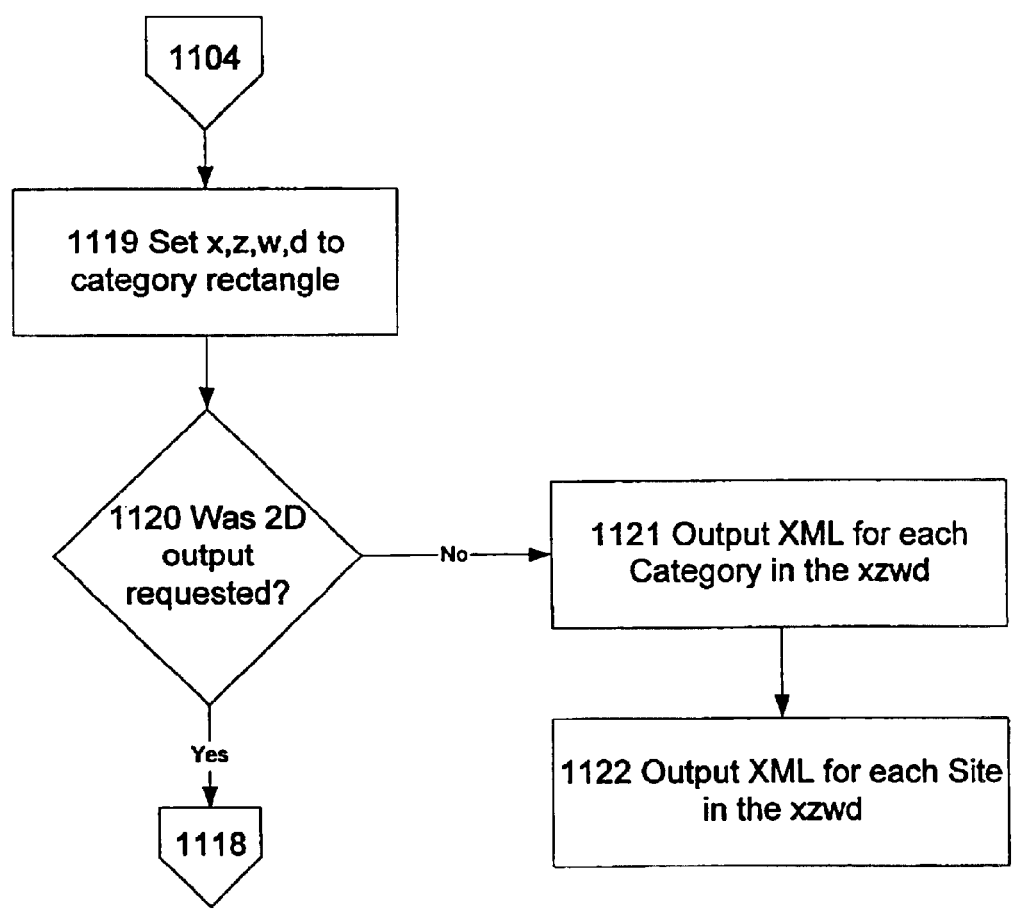

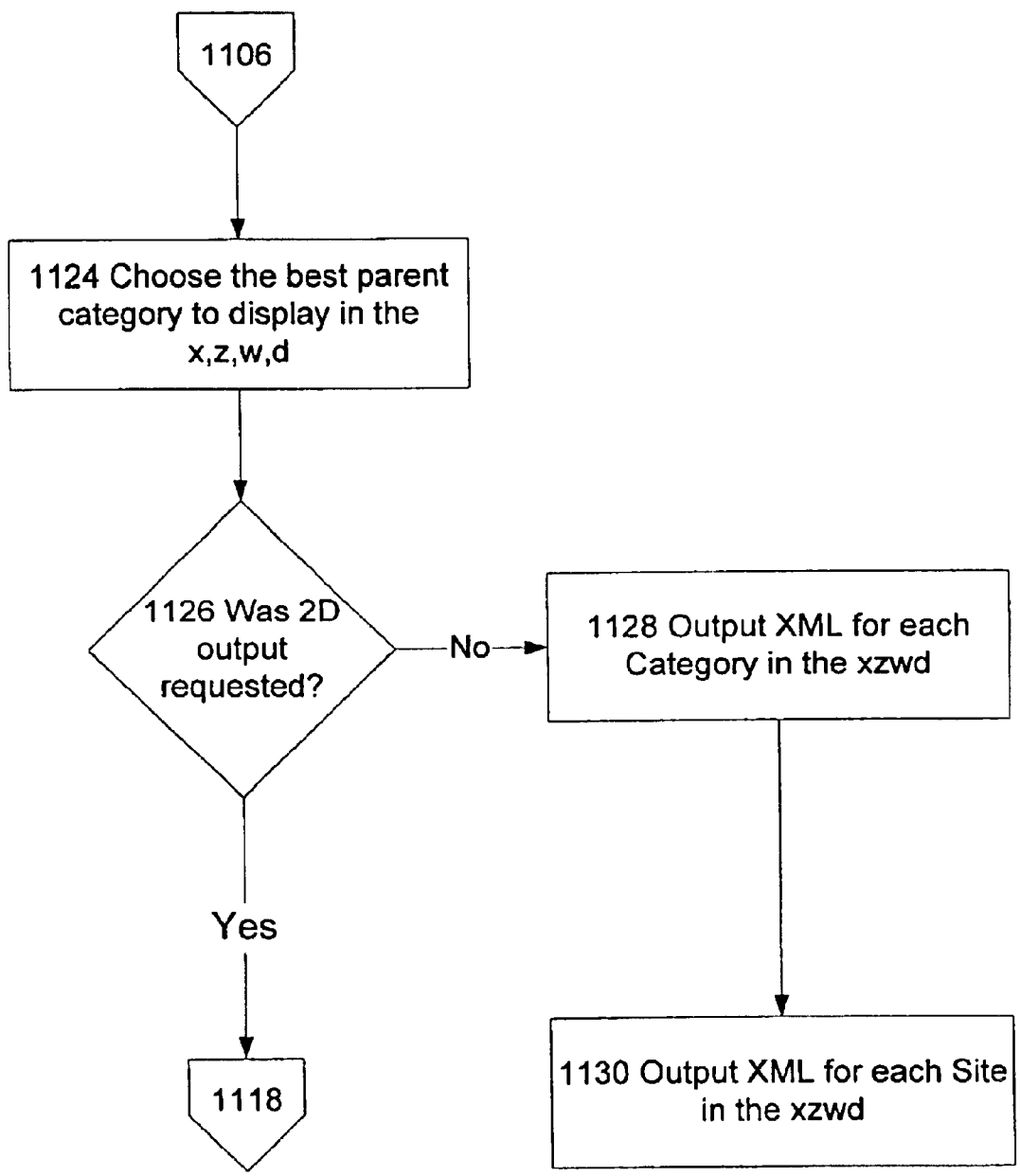
FIGURE 11C - /xzwd Handler

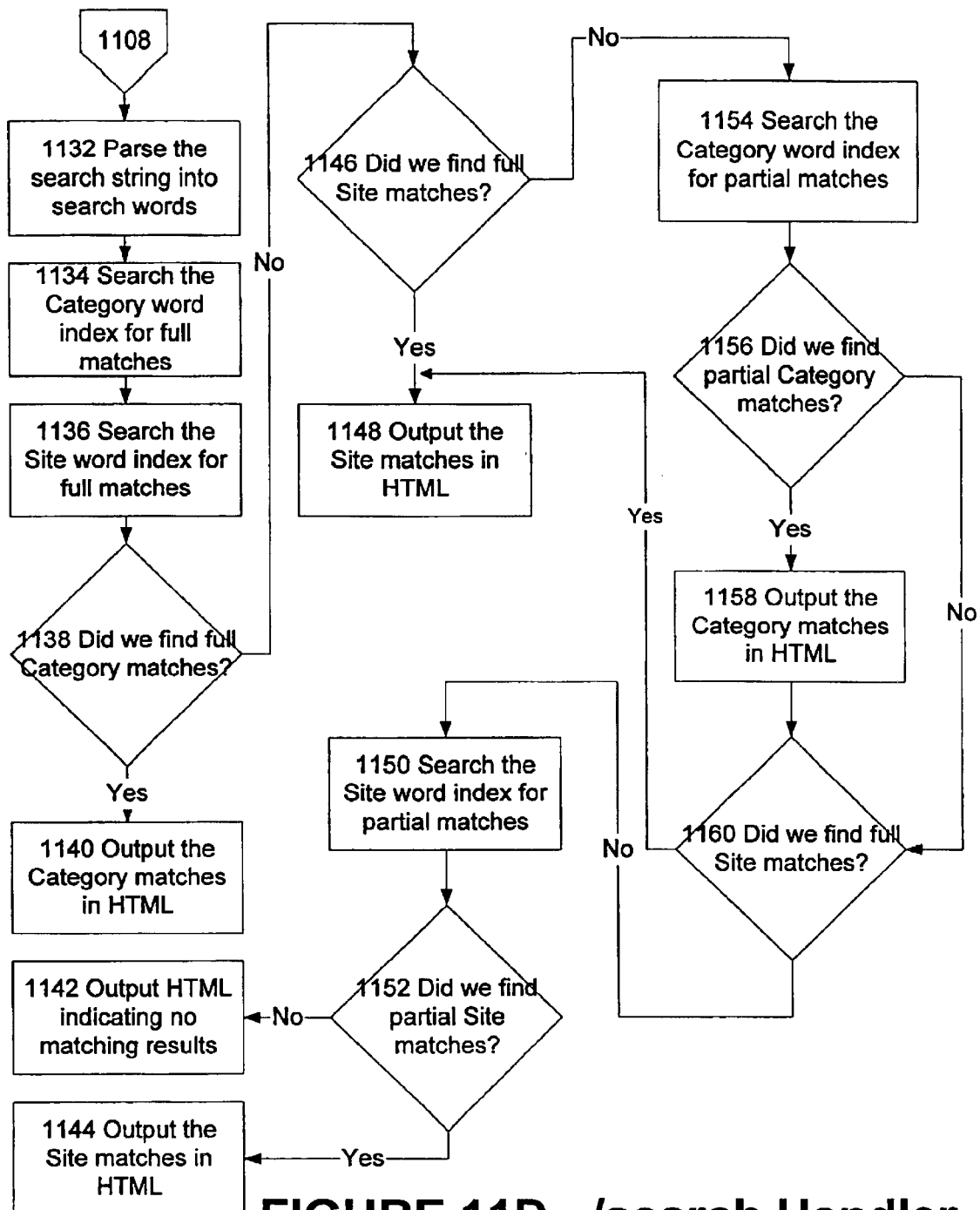
FIGURE 11D - /search Handler

FIGURE 11E - /teleport Handler
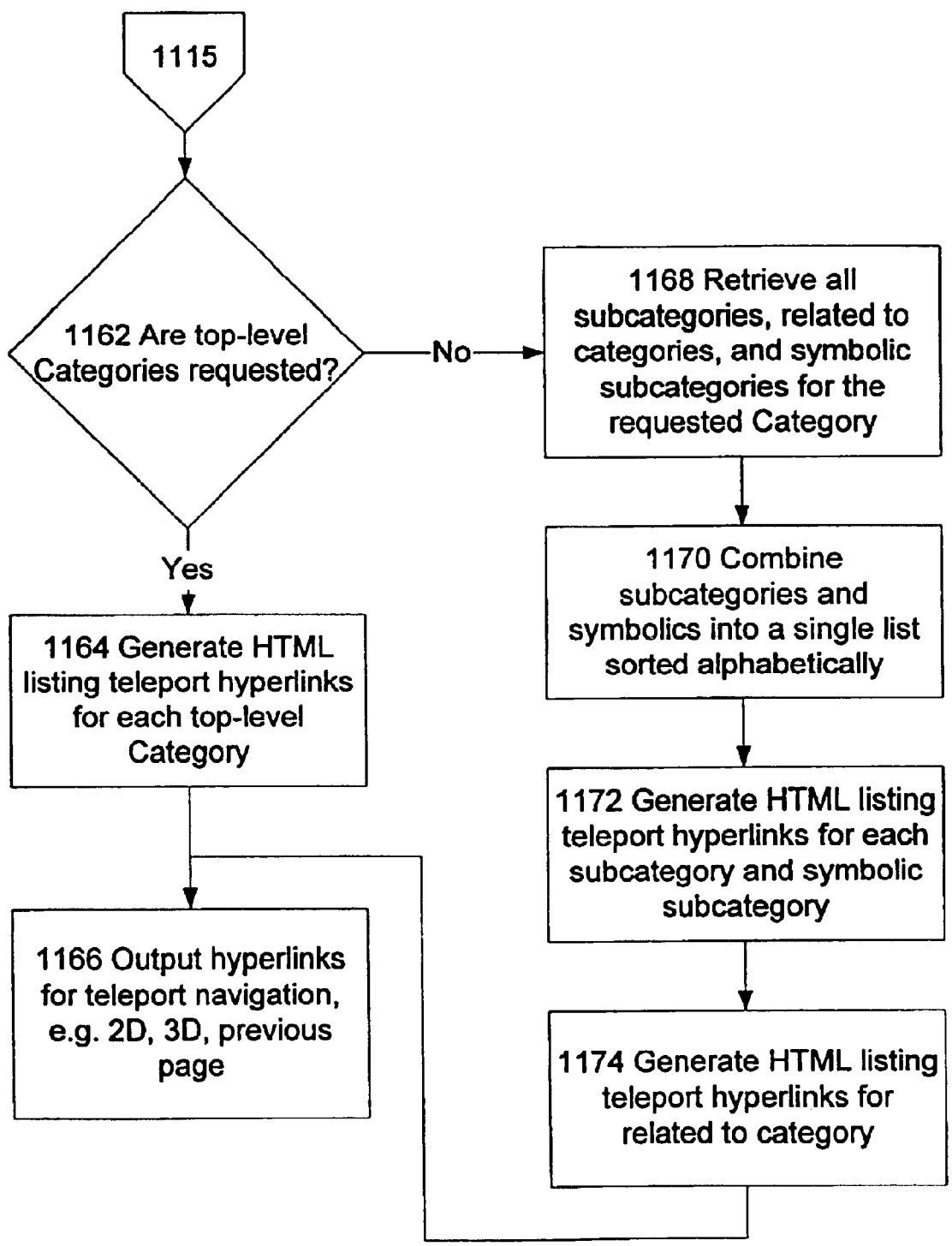

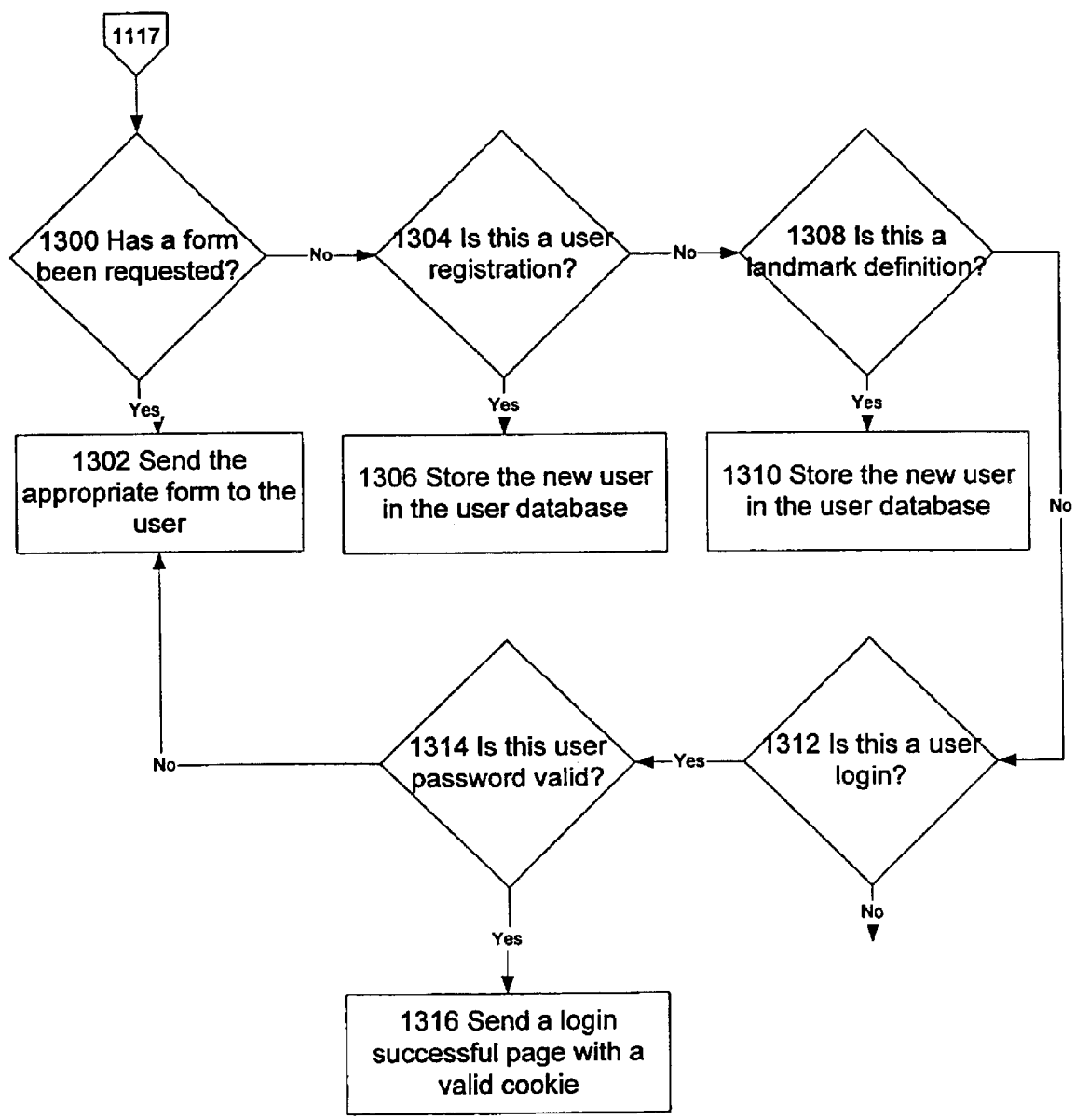
FIGURE 11F - /user Handler

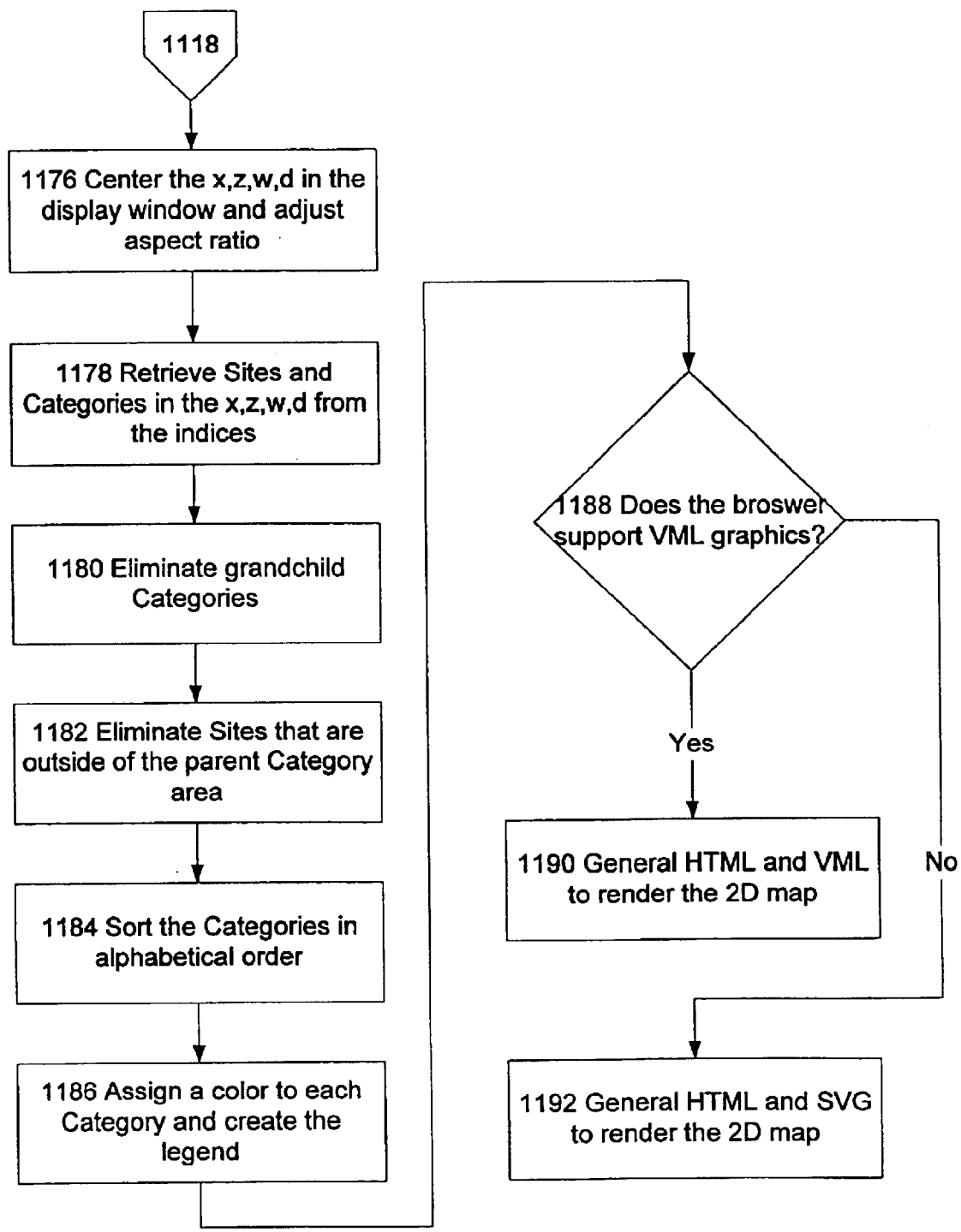

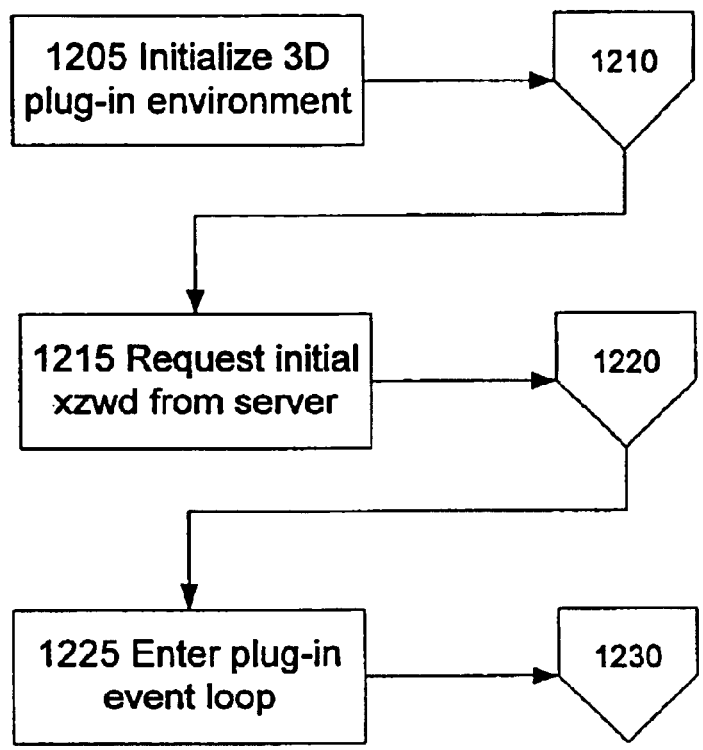
Figure 12A - 3D Browser Plug-in

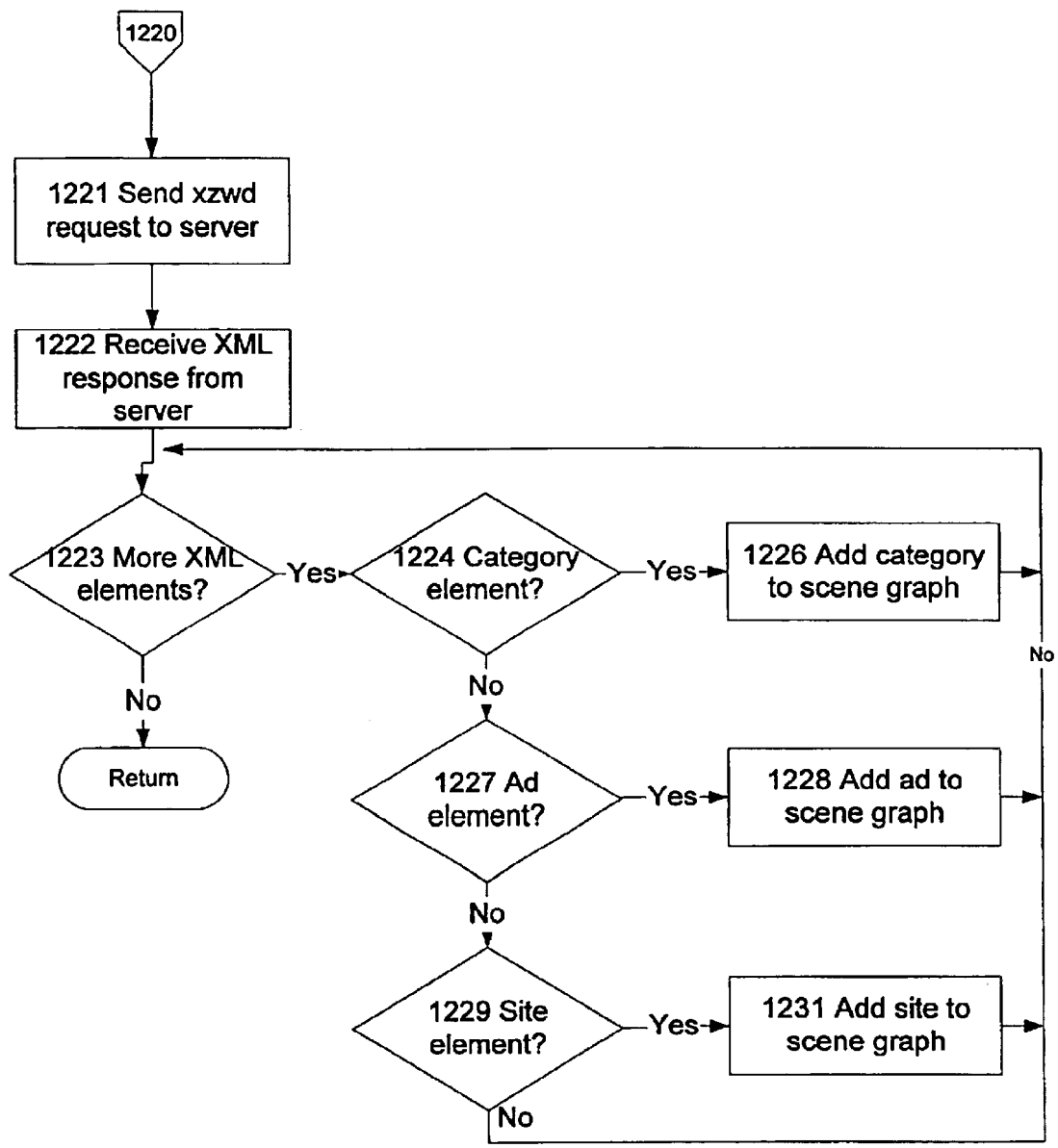

Figure 12C - Plug-in Event Loop
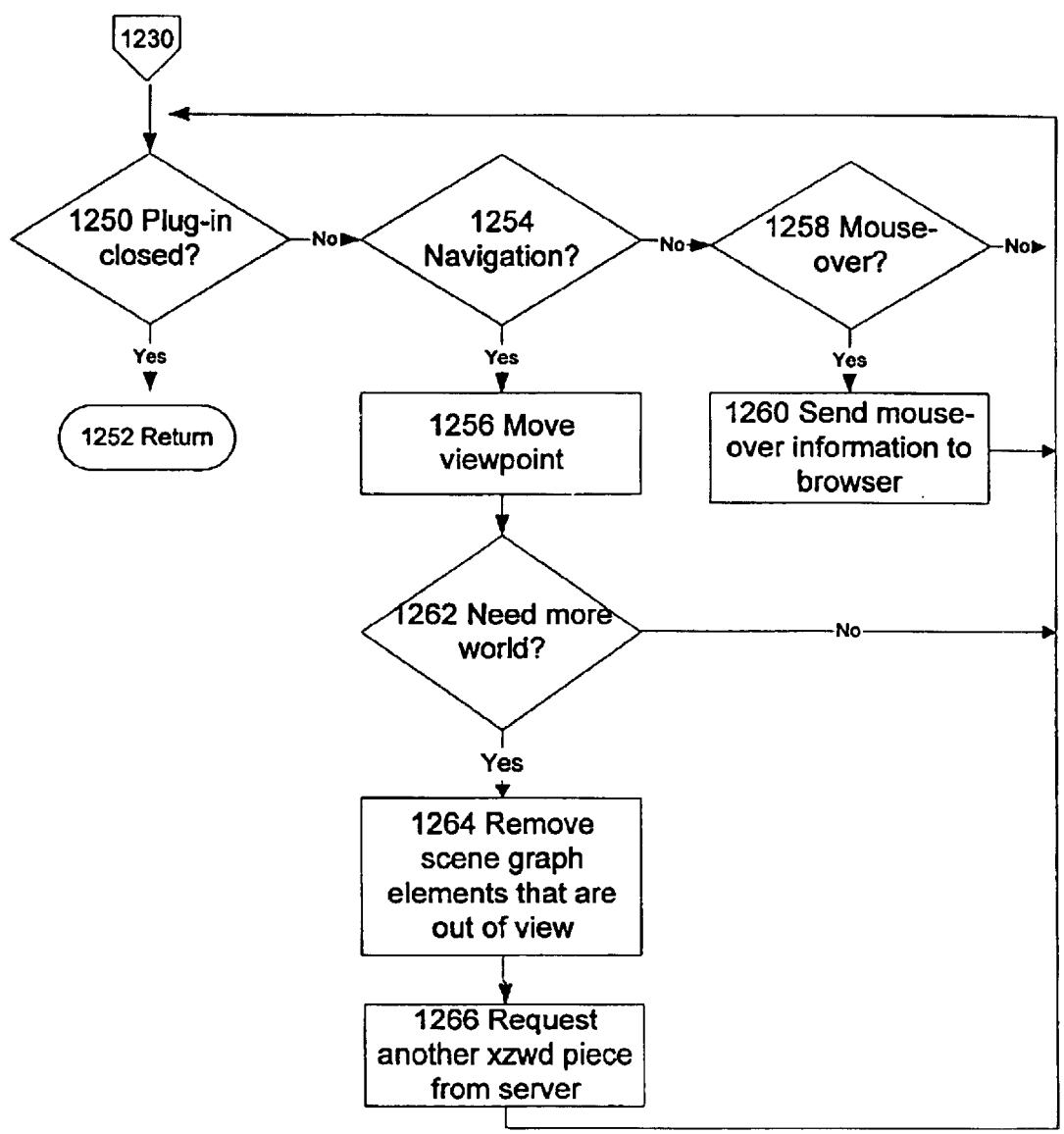

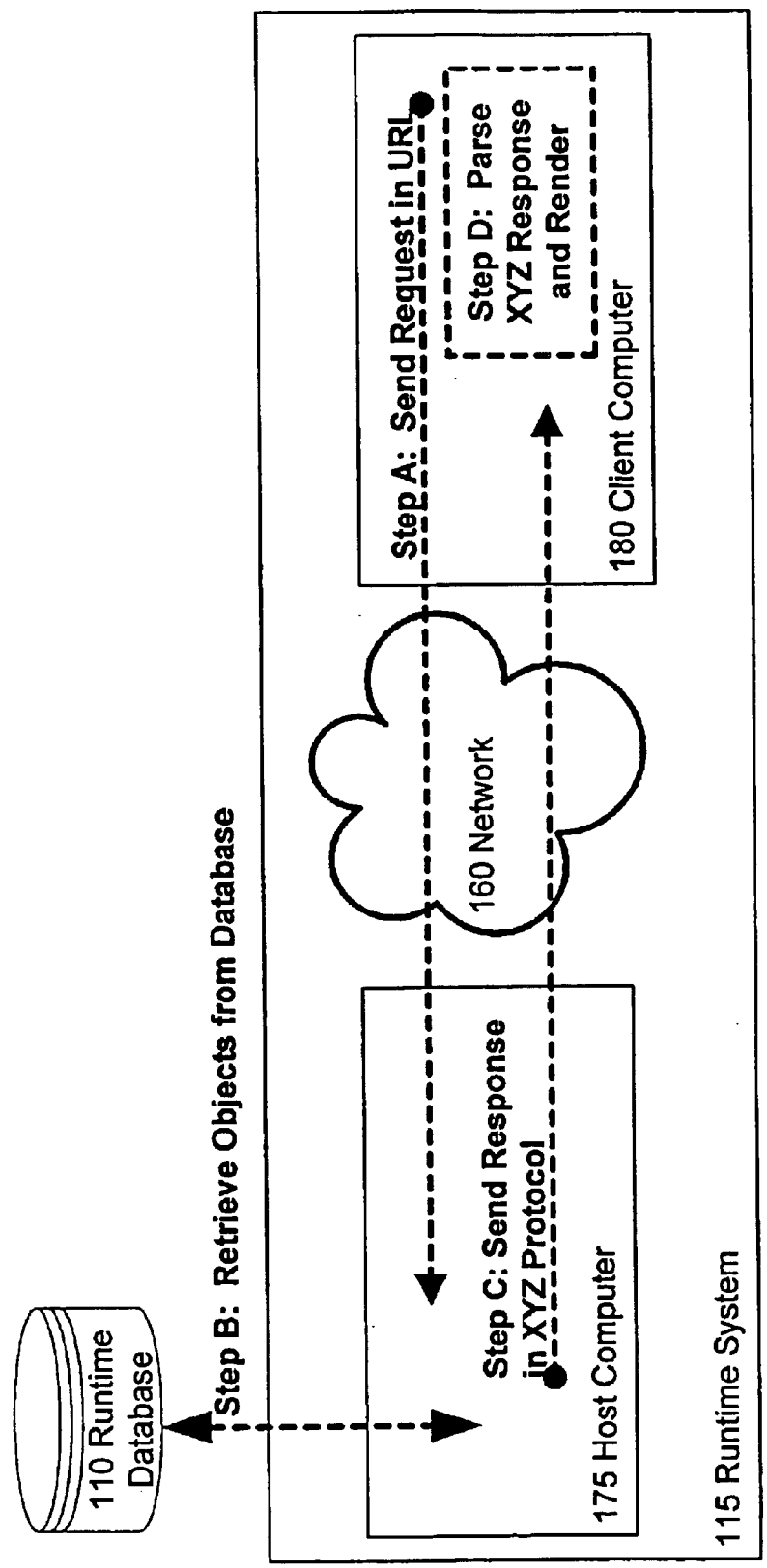
Figure 13 - Request and Response Illustration

METHOD FOR DESCRIBING OBJECTS IN A VIRTUAL SPACE

PRIORITY CLAIM AND CROSS-REFERENCE TO RELATED APPLICATIONS

This application claims the benefit of: U.S. Provisional Application No. 60/232,284, filed Sep. 13, 2000, entitled "System and Method for Network Information Visualization"; and U.S. Provisional Application No. 60/232,213 filed Sep. 13, 2000, entitled "System and Method for Describing Objects in a Virtual Space." The contents of both provisional applications are incorporated herein by reference.

BACKGROUND OF THE INVENTION

The present invention relates to virtual spaces and particularly to using a protocol to lt describe a series of objects onto such a virtual space.

A virtual space consists of a surface with rectangular bounds and the area above the surface. This is very much like a landscape or topography in the real world. Virtual spaces can contain data objects spread across the surface, much in the same way that buildings, roads, and other real-world objects are arrayed on the surface of our world. Just as buildings in the real world can be grouped hierarchically into neighborhoods, cities, or nations, objects in a virtual space can be grouped into hierarchical categories.

Many types of hierarchical objects can be placed in a virtual space. The co-pending application, Ser. No. 09/712,107, filed on Nov. 14, 2000, entitled "System and Method for Network Information Visualization," which is incorporated herein by reference, describes one use for such objects in a virtual space. In that application, a virtual space of URL objects from the Internet is described. In such a system, URLs objects are placed in the virtual space according to categories, such as MUSIC, COMPUTERS, POLITICS, etc. Using the system described (which includes a database, a web server, and a browser), a user connected to the Internet can view and navigate through a 2D map or a 3D map of the virtual space to locate desired URLs. Other categorized virtual spaces could contain a manufacturers' product catalog or a library's card catalog. Or, the virtual space could be used within a geographic information system or a multi-user computer game, for example.

Although applications running on a single computer have not needed a visualization protocol, client/server applications requires the use of some type of visualization protocol. In such a system, a server stores information about the objects in the virtual space on a database and transmits a description of the virtual space over a network (such as the Internet) to client computers. In the past, such client/server computer applications have had disadvantages. The protocols have not been compact and have not made efficient use of network bandwidth. Usually, protocols have consisted of large messages to the client describing all of the details of how to draw a current map portion of the virtual space. One such example of this is VRML (virtual reality markup language). Although such protocols do well in describing the landscape, they use far too much bandwidth. In addition, protocols that enforce a particular visualization severely limit the client application. Such a client cannot alter the presentation of the information to suit the need of different types of user groups. In order to present the information in a different way, both the client and the server must be modified.

Some protocols have had the disadvantage of being closed, proprietary protocols. Although some manufacturers claim that such a closed system best protects their market interests, open source applications, such as Linux, have recently shown that open source applications help to encourage further enhancements and industry adoption of standards.

As with many elements of the Internet, past protocols have acted as though everyone on the Internet speaks English. Non-English speakers have had troubles working with other protocols that do not support other languages. And even English speakers have not been able to easily use past protocols because the protocols have not readily described the categories or other hierarchical principles of the objects and the metadata associated with the objects.

What is needed is an easy-to-use protocol for describing objects in a virtual space. Such a protocol should be extensible, well suited to web-enabled client/server systems, and capable of supporting multiple languages.

SUMMARY OF THE INVENTION

This invention can be regarded as a method and protocol for describing a series of objects mapped onto a virtual space. The method includes the steps of listing metadata for each of the objects and expressing a position within a virtual world for each of the objects to be visualized. The position with the virtual world may be described with an <x,z> coordinate set. For a system which visualizes website information, metadata can include the title of the object, a description, a count of the number of pages within the website object, a count of the number of links pointing either from or to the object, a rating for the website object, etc. The metadata is of course different for other types of hierarchical objects. In addition to describing the objects to be visualized, the method may include describing the locations of one or more categories to with the objects have been assigned.

The present invention differs in many crucial respects from prior work in this field, and the cumulative effect of these innovations is a dramatically improvement in the transfer of visualization data over a network. Some of the advantageous characteristics of the present invention are:

1. The protocol is a compact variable-size textual format that is designed for easy parsing.
2. The protocol is a stable, open, highly interoperable Internet standard.
3. The protocol supports the use of all international character sets.
4. The protocol responses contain only facts, labels, and metadata, no particular graphical rendition on the client software is described.
5. The protocol has built-in support for object location, metadata delivery, and category information.
6. The protocol is well suited for Web deployment since it is built on a base consisting of HTTP, XML, and URLs.
7. The protocol's use of XML Namespaces, it is extensible and so can be used by many different applications.

BRIEF DESCRIPTION OF THE DRAWINGS

For a more complete understanding of the present invention and its features and advantages, reference is made to the following description taken in conjunction with accompanying drawings, in which:

FIG. 6B is a simplified view of a three-dimensional map that can be described by one embodiment of the present invention.

FIGS. 11A through 11G present a flow chart for one embodiment of a map server module in accordance with the present invention.

FIGS. 12A through 12C present a flow chart for one embodiment of a 3D Browser Plug-in, in accordance with the present invention.

FIG. 13 presents an illustration of the use of HTTP, URL, and the XYZ Protocol to communicate between the client and the server.

Figure 3:
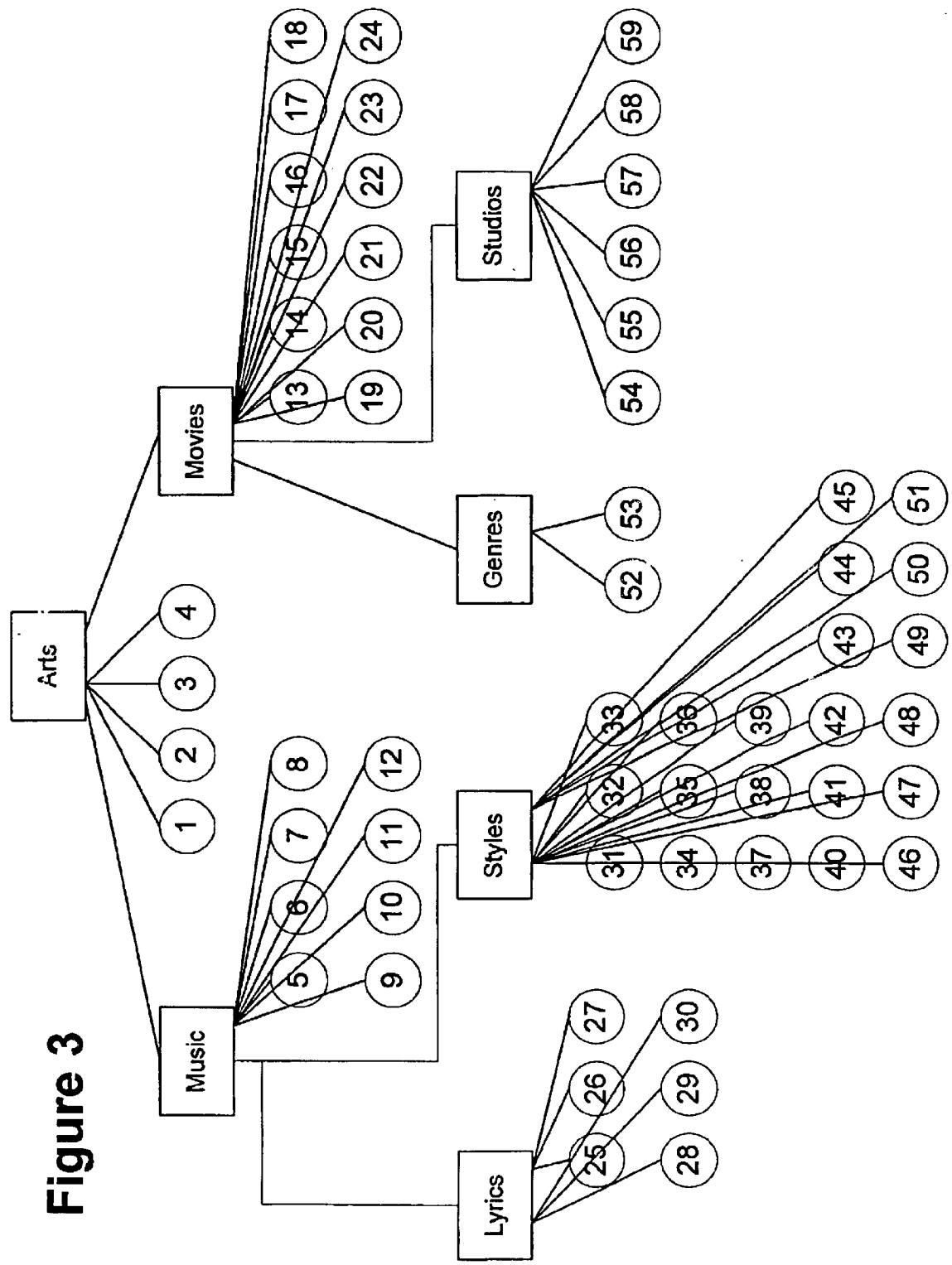
FIG. 3 is a example of a hierarchical directory of objects.

The Figures are not numbered sequentially in this patent application because the Figures are duplicates of Figures in the co-pending application, Ser. No. 09/712,107, filed on Nov. 14, 2000, entitled "System and Method for Network Information Visualization."

DETAILED DESCRIPTION OF PREFERRED EMBODIMENTS

The present invention is a method for describing objects in a virtual space. Throughout the drawings, an attempt has been made to label corresponding elements with the same reference numbers. The reference numbers include:

| Reference Number | Description |
| --- | --- |
| 110 | runtime database |
| 115 | runtime subsystem |
| 150 | map serving software |
| 155 | web server |
| 160 | network |
| 165 | web browser |
| 170 | 3D browser plug-in |
| 175 | host computer |
| 180 | client computer |
| 605 | visualization of object |
| 610 | visualization of category |
| 615 | visualization of metadata |
| 1101–1192 | steps of flowcharts in FIGS. 11A through 11G |
| 1205–1266 | steps of flowcharts in FIGS. 12A through 12C |

In one embodiment of the present invention, objects in a virtual space are described using XML, a data format for structured document interchange over the web. Unlike HTML, XML is A designed to organize information, rather than merely to display it. This structured information contains both content and some indication of what the content means. Basically while HTML is a predefined markup language whose purpose is displaying information, XML is a customized meta-language whose purpose is describing the content of data objects.

In one embodiment of the present invention, a computer system having several modules is configured to use the protocol to provide a visualization of an information network made up of categories and sites. For example, the system can visualize web sites on the Internet by category. Such a visualization provides a map to the user in which each web site is a location within a category, which itself may be a subcategory of another category. In one embodiment, the websites and categories are from the Open Directory (ODP) database of web sites organized by categories (see <dmoz.org>). Another example of an information network ripe for visualization is a computer file system that is organized into Directories and Files. A Directory/File grouping is analogous to a Category/Site grouping.

Throughout this explanation, the category/site visualization will be described. One skilled in the art will understand that such a system can be configured to visualize directory/file and many other types of hierarchical information spaces.

I. Mapping Terminology

Three formats are used to describe a point or a region within the 2D map or the 3D virtual world: XZ-coordinate sets, XYZ-coordinate sets, and XZWD-coordinate sets. An XZ-coordinate set describes a unique location on a two-dimensional map, where the units are in meters. The X-axis of the map increases from left to right while the Z-axis of the map increases from back to front. For example, the coordinate set (50, 1200) describes a location that is 50 meters from the left edge of the world and 1200 meters from the back edge of the world. An XYZ-coordinate set describes a unique location in a three-dimensional space, where the Y-axis of the space increases from bottom to top. Thus, the coordinate set (50, 1200, 300) describes a location that is 50 meters from the left edge of the space, 1200 meters above the surface of the space and 300 meters from the bottom of the space.

An XZWD-coordinate set describes a rectangular polygon region on the surface of the space where W represents the width of the rectangle and D represents its depth. For example, the (1200, 1400, 300, 130) coordinate set represents a rectangle whose back left corner is at 1200 meters from the left of the landscape, 1400 meters from the back of the landscape, and which is in 300 meters in width and 130 meters in depth.

H. Overview of the Visualization System

In one embodiment of the present invention, the Internet is visualized for users of the system as either a 2D map or as a 3D virtual world. Web sites on the Internet are assigned to categories. The categories are hierarchical, so each category can be a parent category having zero or more child subcategories. For example, an ART category can have subcategories of MUSIC and MOVIES. The MUSIC category can have the further subcategories of LYRICS and STYLES.

The computer system maps these categories and web sites to a map region. Each web site is assigned a (x,z) coordinate set which places it at an exact location within the map region. Each category is assigned an area, which is a polygon region within the map region. In one embodiment, the polygon regions are rectangles along the surface of the map region. The rectangles are defined by a (x,z,w,d) coordinate set (where x and z are points along the x-axis and the z-axis, w is a width measurement, and d is a depth measurement).

A segment of the categorized directory of the Internet is presented to the user by displaying each of the categories' polygon regions on the map region. In one embodiment, each polygon region is displayed as a different color to assist the user in differentiating among the categories. In one embodiment, a real region on the Earth is used as the basis for the map region. For example, in one embodiment, the continent of Antarctica is used as the map region and a directory of websites is visualized as locations in Antarctica.

A graphic is displayed for each of the web sites within each of the categories. In a 3D visualization, the graphic may be shown as a type of a building. The graphic that is displayed can be dependent upon a value of one or more metadata items associated with the web site. For example, the better of a review that a web site receives from an editor perhaps the bigger the building is displayed. To further differentiate web sites' graphics on the map region, in one embodiment of the system, the web sites within a category are assigned a visibility rank, where, based on some criteria, the "best" web sites are the most visible. Other metadata for the web sites can also be displayed, either as a permanent part of the visualization, or only upon a specific action (such as the user mousing over the web site's graphic).

In the 3D visualization, a metaphor of a world or city can be used. As already explained, in some embodiments, a real area of the world can be used as the map region, to which the hierarchical objects can be mapped. Each category area can be seen as a neighborhood within a city, and each web site's graphic can seem to be a building within a city. To aid in navigation among the categories, virtual roads can be presented between the category areas.

III. Runtime Database 110

Figure 4:
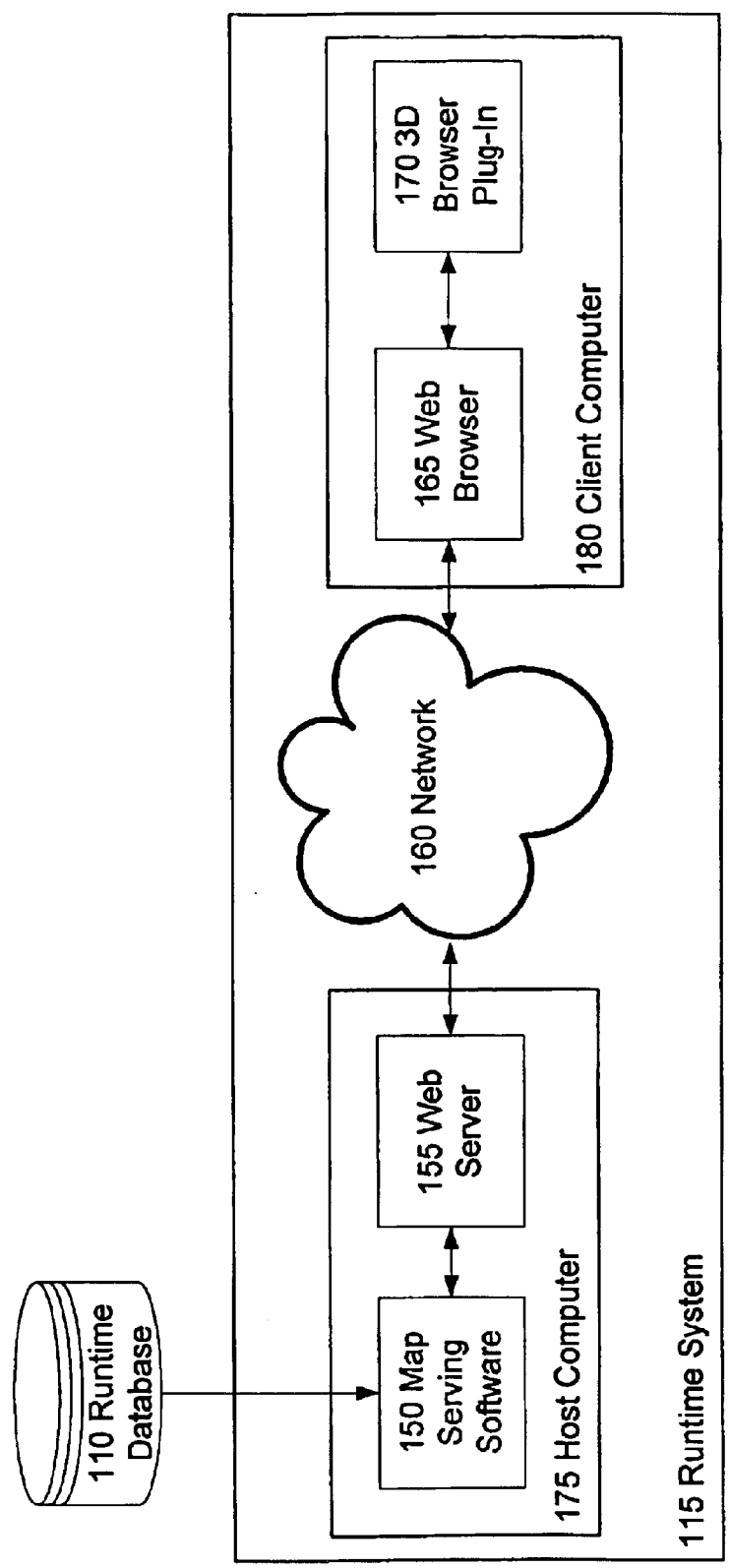
FIG. 4 is a block diagram of one embodiment of a runtime subsystem employing a protocol in accordance with the present invention.

One embodiment of a system utilizing the present invention is shown in FIG. 4. At the heart of such a system is the runtime database 110, which stores the information space being visualized, such as an information network made up of categories and sites, such as shown in FIG. 3.

Categories are organized into a hierarchy, i.e., each category has a single parent category and can have zero or more subcategories or child categories. Categories at the top of a hierarchy are special cases in that they do not have a parent. These are called top-level categories. The system can handle an arbitrary number of categories, top-level categories, subcategories, and hierarchy depth. FIG. 3 shows categories as rectangles. Thus, ARTS, MUSIC, and MOVIES as three of the seven categories. Notice that MUSIC is a child subcategory to ARTS but is a parent category to LYRICS and STYLES.

As well as subcategories, each category can contain zero or more sites (i.e., website). In FIG. 3, sites are shown by numbered circles. Thus, circle 1 is a site associated to the ARTS category. The site could be, for example, <www.walkerart.org>. A site can appear in one or more categories. A site has attributes that are stored in the database such as: title, description, URL, map location, and metadata. Two of the site attributes are key to the function of the system. The first is map location. Each category/site pair is given a unique (x,z) coordinate set locating it on a two-dimensional map.

The second key class of site attributes is metadata. Examples of metadata are: size, in-link count, and out-link count. Site metadata is collected and calculated. Metadata is communicated to a user through the visualization. For example, the size of the graphic can very based on the website's visibility rating.

IV. Runtime Subsystem 115

The runtime subsystem 115, which provides visualization services to users, shown in FIG. 4, consists of a host computer 175 and a client computer 180. The host computer 175 is preferably a commercial Intel PC running the Linux operating system with 1 gigabyte of RAM memory. The runtime subsystem 115 is designed to be scalable and fault tolerant through server replication. In one embodiment, the host computer 175 of the runtime subsystem 115 contains the web server 155 and the map serving software 150 (which responds to queries from visualization clients).

1. The Host Computer 175

A. Web Server 155

One embodiment of the system uses the Apache web server software. This is a robust, commercial-grade, feature-rich, and freely available source code implementation of an http web server. Information on the Apache web server is available at <www.apache.org>.

B. Map Serving Software 150

In one embodiment of the system, the map serving software 150 is an Apache module that responds to queries from the visualization clients 180. The queries are formed using the protocol of the present invention. The server satisfies the queries by extracting the requested data from the runtime database 110. The map serving software 150 has been configured in one embodiment to support the following interfaces, among others:

| Interface | Description |
| --- | --- |
| /category | Retrieve map information by category |
| /xzwd | Retrieve map information by area rectangle |

(1) Map Server Processing 150

FIGS. 11A through 11G describe the functional processing of one embodiment of the map server. Referring to FIG. 11A, the map server parses the URL's parameters from a request (steps 1102) and responds according to which of the seven types of interfaces is involved.

If the request is for a category, then the map server 150 sets x, z, w, and d to the category's coordinates. If 3D output is supported, XML is output for all of the categories (and subcategories) within <x, z, w, d> and then outputs all of the sites within this space (steps 1121 and 1122). Otherwise, if 2D output is required, the x,z,w,d location is centered in the display window (step 1176 of FIG. 11G), and all of the sites and categories within this region are retrieved (step 1178). Categories that are too far below the parent category are eliminated (step 1180) as well as sites that fall outside of the parent category area (step 1182). Me categories are alphabetically sorted (1184) and they are assigned each a different color (step 1186) before being displayed through HTML, etc. (steps 1188, 1190, 1192).

If the /xzwd handler is invoked, the map server 150 determines which parent category is the best to display (step 1124) and then outputs the proper information in either 3D or 2D. A /chat request causes the map server to launch a chat client for the respective category (step 1116). With a /teleport request, an HTML listing is produced listing the hyperlinks for each top-level Category (step 1164) or for each subcategory within a specific category (steps 1168–1174). The hyperlinks listing for allowing teleport navigation is then output (step 1166) to allow the user to jump (i.e., teleport) to any of the listed categories.

If a /search request is made to the map server software 150, the search string is first parsed into the string's component words (step 1132). The category word index is searched to determine whether any direct matches exist (step 1134). Then the site word index is searched to determine whether any direct matches exist for sites (step 1136). If direct matches were found, they are output to the user (step 1140 or step 1148), otherwise partial matches are returned (steps 1154 1160, 1150, 1152, 1142, 1144).

2. The Client Computer 180

The host computer 175 serves information that is requested by various client computers 180 via a computer network 160 such as the Internet's IP network. To access the information from the host computer 175, users with client computers 180 connected to the Internet must have a web browser 165. To process requests and responses that using the protocol of the present invention, the client computer 180 must also have a 3D plug-in 170.

A. Web browser 165

The system is compatible with current web browsers such as Microsoft's Internet Explorer and Netscape's Communicator. Such web browsers provide the user with a two-dimensional visualization of the information space. If the optional 3D plug-in 170 is present, the browser 165 can provide a 3D image.

B. 3D Browser Plug-In 170

The 3d browser plug-in software 170 provides a three-dimensional visualization of the runtime database 110. In such a 3D configuration, a virtual world comprising ground and sky, and in which the websites are represented as buildings can be rendered.

The graphical elements are used to convey metadata information to the user creating a semantically rich landscape. Examples of such graphical elements include: building architecture, size, color, and adornments. Text is used as well to convey information. For example, a text window can be displayed when a user mouses-over a building.

The 3d browser plug-in 170 enables a user to move explore the information landscape by moving around and changing the viewpoint. Integration of the plug-in 170 with html in the browser 165 enables the user to control the visualization with functions such as zoom and teleport.

FIGS. 12A, 12B, and 12C describe the functionality of one embodiment of the 3D browser plug-in 170. Once the plug-in is initialized (step 1205), the first xzwd is requested from the server (step 1222) and the server answers with an XML response (step 1222). Each XML element of the response is parsed as a category (step 1224), an ad (1227), or a site (1229). The main loop of the 3D browser plug-in 170 involves sensing navigation (step 1254) or mousing (1258) actions. If navigation requires more of the virtual world to be displayed, then the display is updated to reflect the new position (steps 1264 and 1266).

V. The XYZ Protocol for Describing Objects

The present invention, which can be called the "XYZ Protocol" is used as a protocol for describing the objects to be visualized. Although the method of the present invention could be implemented in various ways, one method of implementation is to create a series of XML tags. In such an embodiment, the XYZ Protocol is based on top of HTMP and URL. Thus the XYZ Protocol is well suited for Internet-based applications.

The XYZ Protocol is very appropriate for traversing virtual spaces because rather than delivering to the client lengthy instructions on how to render the objects, the Protocol instead delivers only the coordinates for the object and metadata about the object. The client is free to be configured to render the objects as desired. Thus, a single server using the XYZ Protocol to deliver responses describing a set of objects in a virtual space can be simultaneously leveraged by different types of clients. For example, some clients could be configured to depict the objects for school-age users. In such a system, perhaps the web-site objects are shown as different cartoon characters. Other clients could be configured to depict the objects for adults. In this system, the web-site objects can be shown as a city made up of different types and sizes of buildings. New clients with new rendering approaches can be developed without needing to change the server.

The XYZ Protocol is very flexible because by the very nature of XML, new tags can be created and added to the Protocol as necessary. The Protocol is also desirable because it is compact and conserves bandwidth during transmission over protocols (such as VRML) that transmit physical details of the objects to be visualized rather than allowing the client to off-load the rendering process. Since the client undertakes the rendering, the server can handle a large number of users concurrently, sending only facts, labels and metadata in response to the various requests.

The network information visualization system depicted in FIG. 4 can operate using the XYZ Protocol of the present invention. FIG. 13 shows a simplified version of the system of FIG. 4 with the flow of information shown by dashed lines. In such a system, a user uses a web-browser 165 to view a map of the virtual world. The user may cause a request to be constructed by entering a search term, selecting an area of the on-screen map with the mouse, or navigating through the map with the mouse or keyboard. The web browser 165 transmits the request via a HTTP GET method (Step A of FIG. 13). For example, the request might be for a description of the objects within a rectangle whose back left corner is at 120,000 meters form the left of the landscape, 140,000 meters from the back of the landscape, and which is 300 meters in width and 130 meters in depth. In addition, the request may indicate that a maximum of 22 objects should be described. Such a request might be coded as:

http://map.net/xzwd?x=120000;z=140000;w=30;d=130;maxS=22

Alternatively, the request might be coded as:

http://map.net/xyz?x=120000;y=3800;z=140000 to request a view from the position at 120,000 meters from the left of the landscape, 3800 meters above the surface of the landscape, and 140,000 meters from the bottom of the landscape.

The request can be transmitted over the network 165 and received by the host computer 175 web server 155, and passed to the map serving software 150 for a response. As described in FIGS. 11A through 11G, the map serving software 150 can be configured to parse the request, retrieve the specified information from the runtime database 110 (Step B of FIG. 13), and construct the response using the XYZ Protocol via HTTP to the web browser 165 (Step C of FIG. 13).

The set of XYZ Protocol tags and attributes used in the responses are in a reserved XML Namespace. The Namespace includes markup for packaging the whole transmission and for describing the X,Z,W,D region. The Namespace also includes markup for describing each object's URL, Title, Description, and coordinate position, among other things.

1. Elements of the XYZ Protocol

In one embodiment, the XYZ Protocol is made up of the following XML elements:

<?xml ?>
<u></u>

Of course, one skilled in the art could readily construct the protocol with a different selection of tags.

Each of the elements listed above will now be described:

2. The XML Element

| Elements | Attributes | Meaning |
|---|---|---|
| <?xml ?> | | Starts and ends the XML declaration. |
| | version = " " | Describes the version of XML being used, must equal 1.0 as it is currently the only XML version. |
| | encoding = " " | Allows authors to specify the character encoding they will be using. This only needs to be used by authors that are using other encoding besides US-ASCII or UTF-8. |

3. The XYZ Tag

| Elements | Attributes | Meaning |
|---|---|---|
| <xyz> </xyz> | | Opening and closing elements which contains all the XML element names, attribute names and values. |
| | xmlns = " " | XML Name Space. This is used for declaring namespaces and giving elements a unique name. xmlns is a collection of names, identified by a URL, which are used in XML documents as elements and attributes. |
| | path = " " | The value of path corresponds with the map you are currently viewing. |
| | x = " " | The numerical value of "x" corresponds with the x co-ordinates on the map (horizontal measurements, in meters). |
| | y = " " | The numerical value of "y" corresponds with the height in meters you are located above the map (in meters). |
| | z = " " | The numerical value of "z" corresponds with the z co-ordinates on the map (vertical measurements, in meters). |
| | w = " " | The numerical value of "w" corresponds to the width of the entire viewable map area in meters. |
| | d = " " | The numerical value of "d" corresponds to the height of the entire viewable map area in meters. |
| | maxPC = " " | The numerical value of "maxPC" or maximum Page Count corresponds to the highest number of pages on one site. |
| | maxOL = " " | The numerical value of "maxOL" or maximum Out Links corresponds to the highest number of links pointing away from a particular site. |
| | maxIL = " " | The numerical value of "maxIL" or maximum In Links corresponds to the highest number of links pointing to a site. |
| | maxG = " " | The numerical value of "maxG" or maximum graphics corresponds to the graphics intensity of a site. It is currently not in use. |
| | maxR = " " | The numerical value of "maxR" or maximum ratings is either 0 or 100, therefore the maximum value will be 100. |

4. The Copyright Tag

| Elements | Attributes | Meaning |
|---|---|---|
| <copyright> </copyright> | | The copyright Statement. |

5. The Site Tag

| Elements | Attributes | Meaning |
|---|---|---|
| <site> </site> | | Opening and closing statements corresponding to the description of a site located on the map. |
| | pc = " " | Page Count the number of pages contained within the website. |
| | ol = " " | Out Links. The number of links pointing away from a particular site. |
| | il = " " | In Links. The number of links pointing to the site. |
| | g = " " | Graphics Intensity. The graphics complexity of the site. This attribute is currently not being used. |
| | r = " " | Ratings. This value with either 0 or 100. A value of 100 deems the site a "cool site" and marks it with a star. |

6. The U Tag for URLs

| Elements | Attributes | Meaning |
|---|---|---|
| <u> </u> | | Opening and closing elements for the URL of a particular website. |

7. The T Tag for Titles

| Elements | Attributes | Meaning |
|---|---|---|
| <t> </5> | | Opening and closing elements for the title of a particular website. |

8. The D Tag for Descriptions

| Elements | Attributes | Meaning |
|---|---|---|
| <d> </d> | | Opening and closing elements for the description of the contents for a particular website. |

9. The AT Tag for Locations

| Elements | Attributes | Meaning |
|---|---|---|
| <at /> | | The tag corresponding to the location of a particular site on the map. |
| | x = " " | The numerical value of "x" corresponds to the number of meters from the left side of the map in which the site is located. |
| | | The numerical value of "z" corresponds to the number of meters from the top of the map in which the site is located. |
| | z = " " | The numerical value for "cat" corresponds to the category in which the site is located. |

10. The CAT Tag for Categories

| Elements | Attributes | Meaning |
|---|---|---|
| <cat> </cat> | | Opening and closing elements corresponding to the title or subject assigned to each colored square on the map. |
| | id = " " | The category ID number. |
| | x = " " | The numerical value of "x" corresponds to the number of meters from the left side of the map in which the square is situated. |
| | z = " " | The numerical value of "z" corresponds to the number of meters down from the top of the map in which the square is situated. |

-continued

| Elements | Attributes | Meaning |
|---|---|---|
| | w = " " | The numerical value of "w" corresponds to the width of the square in meters on the map. |
| | d = " " | The numerical value of "d" corresponds to the height of the square in meters on the map. |
| | depth = " " | The numerical value of "depth" corresponds to the depth of the category in the hierarchy. A top level category has depth = 0. |

11. The AD Tag for Advertisements

| Elements | Attributes | Meaning |
|---|---|---|
| <ad> </ad> | | The tag corresponding to the location of an advertisement on the map. |
| | cat = " " | The numerical value of "cat" determines which category the ad will be placed within on the map. |
| | x = " " | The "x" co-ordinate of the advertisement on the map. |
| | z = " " | The "z" co-ordinate of the advertisement on the map. |
| | ad = " " | The id of the ad to display. |

12. Document Structure of the Tags

As with HTML, there is a hierarchical structure to the markup used in the XYZ Protocol. The following table shows the relationship of the tags:

| Element | Follows | Contains | Contained In |
|---|---|---|---|
| <?xml ?> | | | |
| <xyz> </xyz> | <?xml /> | <cat> <cat> | |
| | | | |
| | | <u> </u> | |
| <u> </u> | <site> | | |
| | <u> </u> | | |
| | | | |
| | <site> <site> | | |
| | | | |
| | | <u> </u> | |

13. A Sample Response

As explained above, once all of the objects and associated metadata are retrieved from the runtime database 110 for a request from a client 180, the map serving software 150 constructs the response with the above described XYZ Protocol and the response is sent through the network 160 to the client 180 via HTTP (Step C of FIG. 13).

For example, the response might be:

```
<?xml version = "1.0" encoding = "UTF-8" ?>
<xyz xmlns = "http://map.net/xyzSapce" x= "2901100" y= "0" z=
"355000" w= "100" d= "100"
maxPC= "46795" maxOL= "23035" maxIL= "10725" maxG= "82"
maxR= "100">
<copyright>Copyright 2000 Antarcti.ca Systems Inc. </copyright>
<site pc= "2" ol= "3" il= "0" g= "0" r= "0">
    <u>http://www.io.com/~desantom/rad.html</u>
    <t>REXX Adventure Page, The</t>
    <d>A text adventure engine for OS/2 Presentation Manager.</d>
    <at x= "2901105" z= "355005" lat= "17.32.25" long=
    "3.42.34" cat= "34985" />
</site>
<site pc= "2" ol= "1" il= "1" g= "0" r= "0">
    <u>http://www.accessone.com/~conroy/ab.html</u>
    <t>Adventure Builder</t>
    <d>Shareware text adventure game system for Windows.</d>
    <at x= "2901165" z= "355035" lat= "17.32.24" long=
    "3.42.41" cat= "34985" />
</site>
<cat id= "34985" x= "2901100" z= "355000" w= "1300" d= "800"
>Games/Video_Games/Genres/Interactive_Fiction/
Authoring_Systems </cat>
</xyz>
```

Such a response indicates that the subcategory to be visualized is the "Authoring Systems" subcategory. The subcategory is positioned according to the x,z,w,d coordinates of (2901100, 355000, 1300, 800). (In one embodiment, category is rendered by the client as a rectangle plot of virtual land.) Within this category, two web sites are to be displayed: (1) The REXX Adventure Page at coordinates (2901105, 355005), and (2) The Adventure Builder at coordinates (2901165, 355035). The 3D Browser Plug-In 170 parses the XYZ response and renders the objects in a 3D map (Step D of FIG. 13).

VI. Example Visualizations

FIG. 6B shows a 3D visualization of a portion of the information space that was rendered by a client in accordance with an XYZ Protocol response. Here, the visualization of objects 605 is shown as a house 605.1, a factory 605.2, or skyscraper 605.3, depending on the object's visibility rating. From the label "/start/arts/movies", the user can determine that she or he is viewing the "ARTS" top-level category. Visualization of subcategories 610 are the blocks of 'land' underneath the various objects. For example, the MOVIES subcategory is the land area at the foreground of FIG. 6B. Visualization of metadata 615 includes in FIG. 6B the object's title hovering over the object's visualized building.

VII. Conclusion

From the foregoing detailed description, it will be evident that there are a number of changes, adaptations and modifications of the present invention which come within the province of those skilled in the art. However, it is intended that all such variations not departing from the spirit of the invention be considered as within the scope thereof.

What is claimed is:

1. A method for describing a plurality of objects in a map of a virtual space, the method comprising:
    expressing an world position for each of the plurality of objects where the object position defines the location of the object within the virtual space; and
    listing object metadata for each of the plurality of objects, where the object metadata characterizes detail information about each of the plurality of objects;
    wherein the step of listing object metadata comprises listing how much graphical material each of the plurality of objects contains.

2. A method for describing a plurality of objects in a map of a virtual space, the method comprising:

expressing an world position for each of the plurality of objects, where the object position defines the location of the object within the virtual space; and listing object metadata for each of the plurality of objects, where the object metadata characterizes detail information about each of the plurality of objects;

wherein the step of listing object metadata comprises listing a page count of the number of pages contained within each of the plurality of objects.

3. A method for describing a plurality of objects in a map of a virtual space, the method comprising:

expressing an world position for each of the plurality of objects where the object position defines the location of the object within the virtual space; and listing object metadata for each of the plurality of objects, where the object metadata characterizes detail information about each of the plurality of objects;

wherein the step of listing object metadata comprises listing a out-links count of the number of links pointing away from each of the plurality of objects.

4. A method for describing a plurality of objects in a map of a virtual space, the method comprising:

expressing an world position for each of the plurality of objects, where the object position defines the location of the object within the virtual space; and listing object metadata for each of the plurality of objects where the object metadata characterizes detail information about each of the plurality of objects;

wherein the step of listing object metadata comprises listing a in-links count of the number of links pointing to each of the plurality of objects.

5. A method for describing a plurality of objects in a map of a virtual space, the method comprising:

expressing an world position for each of the plurality of objects, where the object position defines the location of the object within the virtual space; and listing object metadata for each of the plurality of objects where the object metadata characterizes detail information about each of the plurality of objects;

wherein the step of listing object metadata comprises listing a rating for each of the plurality of objects.

6. A method for describing a plurality of objects in a map of a virtual space, the method comprising:

expressing an world position for each of the plurality of objects, where the object position defines the location of the object within the virtual space; and listing object metadata for each of the plurality of objects, where the object metadata characterizes detail information about each of the plurality of objects;

wherein the step of listing object metadata comprises listing a logo for a company associated to each of the plurality of objects.

7. A method for describing a plurality of objects in a map of a virtual space, the method comprising:

expressing an world position for each of the plurality of objects where the object position defines the location of the object within the virtual space; and listing object metadata for each of the plurality of objects where the object metadata characterizes detail information about each of the plurality of objects;

wherein the step of listing object metadata comprises listing contact information for a company associated to each of the plurality of objects.

8. A method for describing a plurality of objects in a map of a virtual space, the method comprising:

expressing an world position for each of the plurality of objects where the object position defines the location of the object within the virtual space; and listing object metadata for each of the plurality of objects, where the object metadata characterizes detail information about each of the plurality of objects;

wherein the step of listing object metadata comprises listing an Industry SIC code for a company associated to each of the plurality of objects.

9. A method for describing a plurality of objects in a map of a virtual space, the method comprising:

expressing an world position for each of the plurality of objects, where the object position defines the location of the object within the virtual space; and listing object metadata for each of the plurality of objects, where the object metadata characterizes detail information about each of the plurality of objects;

wherein the step of listing object metadata comprises listing a trading symbol for a company associated to each of the plurality of objects.

* * * * *